United States Patent [19]

Falconio

[11] 3,884,872

[45] May 20, 1975

[54] INORGANIC ZINC SALTS AS COLOR STABILIZERS FOR ACRYLONITRILE VINYL CHLORIDE DYESITE CONTAINING COPOLYMERS

[75] Inventor: Robert R. Falconio, Pottstown, Ohio

[73] Assignee: The Firestone Tire & Rubber Company, Akron, Ohio

[22] Filed: Aug. 7, 1973

[21] Appl. No.: 386,470

[52] U.S. Cl... 260/45.75 W; 260/32.6 N; 260/37 N; 260/79.3
[51] Int. Cl. ............................................ C08f 45/56
[58] Field of Search........... 260/45.75, 32.6 N, 79.3, 260/37 N

[56] References Cited
UNITED STATES PATENTS

| | | | |
|---|---|---|---|
| 2,983,712 | 5/1961 | Wilkinson | 260/79.3 |
| 3,436,364 | 4/1969 | Logemann et al. | 260/45.75 |
| 3,547,899 | 12/1970 | Arit et al. | 260/79.3 |

Primary Examiner—V. P. Hoke

[57] ABSTRACT

A color stabilized modacrylic dye site containing copolymer composition containing from 20 to 80 percent by weight of acrylonitrile with the remainder being vinyl chloride. The color stabilizing agent is selected from inorganic zinc salts and ranges from 0.01 to 5.0 percent by weight of the copolymer.

12 Claims, No Drawings

INORGANIC ZINC SALTS AS COLOR STABILIZERS FOR ACRYLONITRILE VINYL CHLORIDE DYESITE CONTAINING COPOLYMERS

BACKGROUND OF THE INVENTION

The present invention relates to stabilizers for acrylonitrile-vinyl chloride copolymers. More specifically, the present invention relates to inorganic zinc salts as color stabilizers for acrylonitrile-vinyl chloride dye site containing copolymers.

As well known to those skilled in the art, the copolymers of acrylonitrile and vinyl chloride have poor heat and color stability. This is usually attributed to the enhanced tendency of the polyvinylchloride portion of the copolymer to dehydrochlorination when copolymerized with the acrylonitrile. The dehydrochlorination is thought to start during the formation of the copolymer in the polymerization process. Further degradation easily occurs when the copolymer is subjected to any post polymerization heat treatment. In fact, the resulting stability of the copolymer as judged by "yellowing" of the compound is much poorer than either of the individual polymers of polyacrylonitrile or polyvinylchloride. Heretofore, the only manner of increasing the heat stability and thus reducing the yellowing affect was to utilize antioxidant compounds. However, such compounds only have a slight effect on improving the heat or color stability of the copolymer. As a result, non-yellow or white acrylonitrile-vinyl chloride copolymers to date have not been successfully produced for industrial or commercial purposes.

Heretofore, it has been well established and substantiated by literature, that the use of inorganic zinc bases such as zinc oxide, and salts such as zinc chloride should be avoided since they catalyze thermal degradation or dehydrochlorination of polyvinylchloride and often cause it to blacken. Thus, should an inorganic zinc salt be utilized as a stabilizer such as for halogenated vinyl resins, it has usually been in combination with other compounds as in U.S. Pat. No. 2,918,451, in order to avoid this adverse effect.

Although acrylonitrile polymers are quite white, they and especially dyed polymers are subject to discoloration upon exposure to ultraviolet lights such as sunlight. In order to light stabilize acrylonitrile polymers against weatherability, organic zinc and chromium compounds have been utilized, (British Pat. No. 949,874) along with zinc oxide. As known to one skilled in the art, zinc oxide is a well known light stabilizing agent in polymer compositions against ultraviolet light. When used in acrylonitrile polymers, it has been found that zinc oxide may cause the polymer to yellow. Hence, it is undesirable for the production of acrylonitrile wherein whiteness is desired.

Patents directed to the color stability or whiteness of acrylonitrile polymers are U.S. Pat. Nos. 2,801,987 and 2,804,444 which relate to complex organic compounds. However, both patents involve complex organic compounds totally unrelated to the compounds of the present invention. Moreover, compounds of U.S. Pat. No. 2,801,987 are simply as specifc type of antioxidant.

SUMMARY OF THE INVENTION

It is therefore an object of the present invention to provide an acrylonitrile-vinyl chloride copolymer which has improved heat and color stability.

It is a further object of the present invention to provide an improved heat and color stabilized acrylonitrile-vinyl chloride copolymer as above, by providing dye sites in the copolymer.

It is another object of the present invention to provide an improved heat and color stabilized acrylonitrile-vinyl chloride copolymer, as above, through the addition of inorganic zinc salts.

These and other objects of the present invention will become apparent from the following specification which describes in detail various embodiments without attempting to discuss all of the many modifications in which the invention might be embodied; the invention being measured by the appended claims and not by the details of the specification. In general, a modacrylic dye site composition containing from 20 to 80 percent of acrylonitrile with the remainder being vinyl chloride, is color stabilized by an inorganic zinc salt and zinc oxide.

DESCRIPTION OF THE PREFERRED EMBODIMENTS

According to the concepts of the present invention, it has been found that copolymers of acrylonitrile and vinyl chloride which contain dye sites can be heat and color stabilized against a yellow appearance by the addition of inorganic zinc compounds, namely zinc salts and a specific zinc base, zinc oxide. Specific types of zinc salts found to be useful include zinc carbonate, zinc chloride and zinc sulfate. Zinc carbonate and zinc sulfate are preferred. Such a result was completely unexpected since it is well known to one skilled in the art that inorganic zinc salts and zinc oxide, a base are detrimental to the heat and color stability of polyvinylchloride and that zinc oxide tends to yellow acrylonitrile polymers.

Preferably, the vinyl chloride-acrylonitrile copolymers of the present invention are provided with dye-sites in a manner as set forth in a commonly owned co-pending application bearing U.S. Ser. No. 230,966, filed Mar. 1, 1972. In this specification, it was disclosed that specific amine sulfonate salts reacted with ethylenically unsaturated monomers or mixtures of such monomers to form products which exhibit excellent receptivity for cationic dyes. In other words, such polymers or copolymers exhibited a very high dye take-up and the production of such polymers or copolymers could be carried out in emulsion or suspension systems. Moreover, the presence of such dye sites without the addition of actual dyes tends to generally improve the whiteness of the polymers.

The amine sulfonate salt is made by reacting a sulfonic acid with a higher alkyl group containing a primary, secondary or tertiary amino compound. More specifically, the sulfonate acid may be any compound of the formula I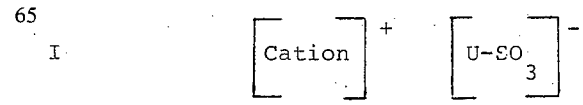

wherein

U is an ethylenically unsaturated group of an activity appropriate for copolymerization with vinyl chloride and acrylonitrile monomers in the mixture and

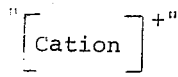

indicates a hydrogen ion or appropriate metallic ion. Suitable compounds of this type will be seen to include any allyl or vinyl containing alkyl or aryl sulfonic acid, for instance styrene sulfonic acid, vinyl sulfonic acid, sulfoethyl methacrylate, 2-acrylamido-2-methylpropane sulfonic acid (AMPS), methallyl sulfonic acid, α-methyl styrene sulfonic acid, allyl sulfonic acid, ortho methyl styrene sulfonic acid, sulfoethyl acrylate, 2-acrylamido-2-methyl butane sulfonic acid, vinyl benzyl sulfonic acid.

The higher fatty amino compound, hereinafter designated (II) providing the cationic moiety of the amine sulfonate salt may be any compound containing a primary, secondary or tertiary amine group and a higher alkyl group or groups containing a total of from 8 to 30 carbon atoms, such for instance as octyl decyl amine, N-coco beta amino butyric acid ("coco" signifies the mixed alkyl groups averaging about 12 carbon atoms derived from coconut oil), n-octyl amine, lauryl amine, octadecyl amine, hexadecyl amine, N-coco beta amino propionic acid, di-2-ethylhexyl amine, di-cyclohexyl amine, n-lauryl-myristyl beta amino propionic acid, dimethyl octyl amine, dimethyl lauryl amine, dimethyl tetradecyl amine, dimethyl hexadecylamine, dimethyl octadecyl amine, dimethyl behenyl amine, tributyl amine, triamyl amine, ethyl methyl octyl amine, dilauryl amine, behenyl amine, diamyl amine, ethyl cyclohexyl amine, long chain ethanol amines and long chain ethoxylated amines.

The amine sulfonate salt monomer (III) may be any salt having its cation derived from the sulfonic compound (I) and the amino compound (II). If the monomeric compound (III) is not available as such, it may be readily prepared by reacting, in an acidified aqueous medium, a sodium or other salt of the sulfonic acid (I) with the amino compound (II). The resultant monomeric salt compound is precipitated and may be recovered by filtration or decantation and then used in the polymerization reaction. Alternatively, since aqueous media are involved, the monomer (III) may be prepared in situ in the aqueous medium in which the final polymerization takes place. In accordance with still another method, the amine (II) sulfonic acid (I) and a small amount of water are added to the vinyl chloride and acrylonitrile monomers with which the salt (III) is to be copolymerized. The salt (III) is directly formed and dissolves rapidly in the monomers.

The polymerization process when an amine sulfonate salt as set forth above may be carried out in suspension, i.e., in an aqueous medium containing a colloidal-type suspending agent and a free-radical generating agent which is soluble in the monomeric phase. The mass is agitated to keep the monomer in suspension as globules in the medium, and the product is recovered as granules which are physically separated from the aqueous medium at the close of polymerization.

Likewise, the reaction may be carried out by conventional emulsion polymerization methods well known to those skilled in the art.

The amine sulfonate salt (III) can either have been previously prepared and charged to the polymerization reactor mixture as such, or it may be synthesized in situ in the polymerization mass by charging the constituents (the sulfonic acid I or a salt thereof, and the amino compound II) thereof in stoichiometric proportions into the polymerization medium. Alternatively, the amine (II), sulfonic acid (I) and a small amount of water are added to the other monomers, and agitated therewith. Reaction occurs substantially instantaneously and quantitatively. Preferably the medium should be made slightly acidic, as by the addition of acetic acid, to insure reaction.

In general, the acrylonitrile-vinyl chloride copolymers of the present invention range from approximately 20 percent to approximately 80 percent of either acrylonitrile or vinyl chloride with the remainder being the other constituent. Such copolymers when converted to fibers are generally classified as modacrylic fibers. A range of from about 20 to about 40 percent of vinyl chloride is preferred while a still more favored range is from about 30 to about 35 percent. The copolymers can have a great range of molecular weight and, of course, the copolymers can have a specific molecular weight range which gives favorable physical properties for a particular application. Based upon 100 parts of the copolymer, the amount of dye site constituent will generally range from 0.1 to 10.0 parts by weight, and since it adds directly to the chain, a terpolymer will be formed. Generally, such terpolymer or dye site containing copolymers may be dissolved in dimethyl formamide (DMF) to produce an article. Other solvents include dimethyl sulfoxide (DMSO), dimethylacetamide and tetramethylene sulfone. Generally, dye site containing copolymers of the present invention have an intrinsic viscosity of approximately 0.9 to 1.5 when DMF is used as the solvent for determining the instrinsic viscosity.

The dye site containing copolymers after formation may be wet or dry spun or otherwise dried. Generally, at this stage of the process it may be desirable to use any conventional antioxidant well known to the art to prevent degradation of the dye site containing copolymer due, of course, to oxidation. Specific antioxidants include the tri-alkyl-phosphites wherein the alkyl range is from 4 to 10 carbon atoms such as triisoocytlphosphite and the di-alkyl-thio-diproprionates wherein the alkyl range is from 12 to 18 carbon atoms such as dilaurylthiodipropionate.

The amount of zinc salt and zinc oxide found to give favorable results in color whiteness as well as heat stability ranges from 0.01 to about 5.0 percent by weight based upon the vinyl chloride-acrylonitrile copolymer and preferably ranges from 0.1 to about 1.0 percent. Use of zinc salts in this range has been found to impart color stability to sheets, films, fibers and the like such that the physical appearance of the finished article is non-yellow or much whiter than previous vinyl chloride-acrylonitrile copolymers and dye site containing copolymers. Although the exact reason for this unexpected result is not clearly understood, it is hypothesized that during polymerization of the copolymer, some degradation of the vinyl chloride polymer constituent takes place with the loss of HCl. The hydrochloric acid then attacks the copolymer which causes discoloration such as yellowing. The specific zinc oxide and zinc carbonate compounds of the present invention are thought to react with the acid to tie it up. The situation with respect to zinc chloride is not fully understood. In any event, the acrylonitrile-vinyl chloride dye containing site copolymers are unexpectedly improved in heat stability as well as color stability including the visual white appearance. The improved whiteness is quite apparent in acrylonitrile-vinyl chloride fibers, therefore the dye site containing copolymer made according to the concepts of the present invention can be used for drapes, carpets, clothes such as children's pajamas and other items wherein a white color is desired. Moreover, since the dye site containing copolymer is flame retardant, it can be employed in numerous other applications where potential fire hazards exist.

A dye site containing vinyl chloride-acrylonitrile copolymer prepared according to the concepts of the present invention may have the following recipe Example I Vinyl chloride-acrylonitrile dye site containing copolymer

EXAMPLE I

| | | |
|---|---|---|
| Water (deionized) | 200 | grams |
| Vinyl chloride | 45 | grams |
| Acrylonitrile | 45 | grams |
| Amps (2-Acrylamido-2-methylpropane sulfonic acid | 3 | grams |
| Dimethytetradecylamine | 5 | grams |
| 87% Hydrolyzed polyvinyl alcohol | 2.0 | grams |
| Lauroyl Peroxide | 6 | grams |

The sulfonic compound and the amino compound were charged together with the water and polyvinyl alcohol into a polymerization bottle. The water was slightly acidified with acetic acid and the contents swirled. Reaction was substantially instantaneous and the amino salt of the sulfonic compound separated out as oily globules. A slight excess of vinyl chloride above the recipe amount was then charged and allowed to evaporate down to the recipe amount (as determined by tare and reweighing) thereby purging the free space in the bottle. The bottle was then sealed with a crown cap having a nitrile rubber seal and a perforation for the hypodermic injection of reactant. The lauroyl peroxide was then injected, and the bottle placed on a polymerization wheel which dipped and revolved the bottle in a water bath at 60°C. for 18 hours. At the end of this time, the unreacted monomers were vented, the bottle was opened, and the granular dye site containing copolymer recovered by filtration and washed on the filter with deionized water. The granular material was then dried on a tray in an oven at 60°C. for 12 hours.

A dye site containing copolymer so prepared was then tested by a spectrophotometer for optical whiteness. Preparation of the solutions involved adding various amounts of inorganic zinc salts and zinc oxide, if any, to 90 grams of DMF (dimethyl formamide) and cooling the solution in a freezer. Ten grams of the dye site containing copolymer as prepared in Example I was then added to the cold solution and mixed by shaking or rolling until complete solution was acheived. Next, the mixed solution was placed in a hot air blown oven for 4 hours at 120°C. The solutions were cooled before test readings were taken. The specific instrument utilized was a Beckman DB spectrophotometer at a wave length absorbance of 425 nanometers with the quartz test cells having a 1 centimeter path length. The following table lists the effect of the various zinc salts and zinc oxide on the DMF solution of polyvinyl chloride, polyacrylonitrile, and the dye site containing copolymer. The initial absorbance (Ai) was measured immediately after the solutions were prepared at room temperature. The final absorbance (Af) was measured on the solutions after they had been removed from the oven and cooled. The lower the spectrophotometer reading, the less yellow the solution. 2.0 is the maximum dial reading on the instrument and indicates a dark yellow to a black solution.

TABLE I

Oven stability test of dye site containing vinyl chloride-acrylonitrile copolymers stabilized with inorganic zinc salts and zinc oxide

| SAMPLE | | Spectrophotometer Readings | |
|---|---|---|---|
| | | Initial Ai | Final Af(4hr. at 120°C) |
| 1. | Polyvinylchloride (low mol. wt.) | 0.015 | 2.0 black |
| | Polyvinychoride- 0.1% ZnO | 0.37 | 2.0 black |
| | Polyvinylchloride- 0.1% ZnCO$_3$ | 0.14 | 2.0 black |
| | Polyvinylchloride- 0.1% ZnCl$_2$ | 0.02 | 2.0 black |
| | Polyvinylchloride- 0.5% ZnCl$_2$ | 0.02 | 2.0 black |
| | Polyvinylchloride- 0.1% ZnSO$_4$ | 0.01 | 2.0 black |
| | Polyvinylchloride- 0.5% ZnSO$_4$ | 0.01 | 2.0 black |
| 2. | Polyvinylchloride (med.mol.wt.) | | black gel |
| | Polyvinylchloride- 0.5% ZnO | * | dark yellow gel |
| | Polyvinylchloride- 0.5% ZnCO$_3$ | * | black gel |
| 3. | Polyacrylonitrile | 0.07 | 0.43 sl. yellow |
| | Polyacrylonitrile- 0.1% ZnO | 0.58 | 1.90 yellow |
| | Polyacrylonitrile- 0.5% ZnO | 1.85 | 1.99 lt. orange |
| | Polyacrylonitrile- 0.1% ZnCO$_3$ | 0.14 | 0.84 yellow |
| | Polyacrylonitrile- 0.5% ZnCO$_3$ | 0.66 | 1.55 amber |
| | Polyacrylonitrile- 0.1% ZnCl$_2$ | 0.07 | 1.0 yellow |
| | Polyacrylonitrile- 0.5% ZnCl$_2$ | 0.09 | 2.0 dark brown |
| | Polyacrylonitrile- 0.1% ZnSO$_4$ | 0.10 | 0.54 dark amber |
| | Polyacrylonitrile- 0.5% ZnSO$_4$ | 0.13 | 1.1 dark amber |
| 4. | Dye Site Containing Vinyl Chloride Acrylonitrile Copolymer | 0.09 clear | 0.51 yellow-amber |
| | do. -0.1% ZnO | 0.24 cloudy | 0.39 clear |
| | do. -0.5% ZnO | 1.75 v. cloudy | 0.64 clear |
| | do. -0.1% ZnCO$_3$ | 0.13 sl. cloudy | 0.40 clear |
| | do. -0.5% ZnCO$_3$ | 0.60 cloudy | 0.36 clear |
| | do. -0.1% ZnCl$_2$ | 0.08 clear | 0.47 clear |
| | do. -0.5% ZnCl$_2$ | 0.10 clear | 0.46 clear |
| | do. -0.1% ZnSO$_4$ | 0.08 clear | 0.41 clear |
| | do. -0.5% ZnSO$_4$ | 0.10 clear | 0.31 clear |

* No reading could be taken because of gel formation.

The final absorbance test is very important since it is indicative of the final article produced after being dissolved in a solvent such as DMF. As is readily apparent from the table, low and medium molecular weight polyvinyl chloride produced a black solution as did polyvinylchloride with the various zinc salt stabilizers. Although the heated polyacrylonitrile solution had a slightly yellow color. Those containing the zinc salts and zinc oxide in general darkened the solution from yellow to a dark brown. The dye site containing vinyl chloride-acrylonitrile copolymer without any stabilizers produced a yellow to an amber color. However, upon the addition of the various inorganic zinc salts and zinc oxide, the final color was a much lighter yellow in every situation with the final absorption reading generally being lower. In view of the fact that the inorganic zinc salts and zinc oxide imparted a much darker color to polyacrylonitrile compounds whereas the polyvinyl chloride compounds were already black, it was unexpected that such inorganic zinc compounds would actually produce clear lighter yellow solutions when dye site containing vinyl chlorideacrylonitrile copolymers were utilized.

In general, the improvement utilizing inorganic zinc oxide and zinc salts was very apparent when fibers were made from the dye site containing copolymers. Ordinarily, on a yellow scale ranging from 1 to 10 with the higher values indicating a very yellow fiber, the dye site containing vinyl chloride-acrylonitrile copolymer fibers generally had a reading of about 7. However, when the inorganic zinc salts and zinc oxide were added, the color decreased to a rating of about 3 or 4. Such an improvement is considered very significant in the fiber industry.

It can thus be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A color stabilized copolymer composition comprising, a copolymer having from about 20 to about 80 percent by weight of vinyl chloride and from about 80 to about 20 percent of acrylonitrile, said copolymer having from 0.01 to 10 percent by weight of a dye site, said dye site being an amine sulfonate salt of a sulfonic acid and a higher alkyl group containing primary, secondary or tertiary amino compounds and, said copolymer having from 0.01 to about 5 percent by weight of a color stabilizing inorganic zinc compound, said inorganic zinc compound selected from the group consisting of zinc oxide, zinc chloride, zinc carbonate and zinc sulfate.

2. A color stabilized copolymer composition as in claim 1, wherein said range of vinyl chloride is from 20 percent to 40 percent and said range of acrylonitrile is from 80 percent to 60 percent.

3. A color stabilized copolymer composition as in claim 1, wherein said vinyl chloride range is from about 30 to about 35 percent and said acrylonitrile range is from about 70 to about 65 percent.

4. A color stabilized copolymer composition as set forth in claim 1, wherein said sulfonic acid is 2-acrylamido-2-methyl propane sulfonic acid.

5. A color stabilized copolymer composition as in claim 1, wherein said higher alkyl group contain from 8 to 30 carbon atoms.

6. A color stabilized copolymer composition as in claim 5, wherein said vinyl chloride ranges from about 20 to about 40 percent and said acrylonitrile ranges from about 80 to about 60 percent.

7. A color stabilized copolymer composition as in claim 5, wherein said vinyl chloride ranges from about 30 to about 35 percent and said acrylonitrile ranges from about 70 to about 65 percent.

8. A color stabilized copolymer composition as in claim 6, wherein said inorganic zinc compound is selected from the group consisting of zinc oxide.

9. A color stabilized copolymer composition as in claim 6, wherein said zinc compound ranges from 0.1 to about 1.0 percent by weight.

10. A color stabilized copolymer composition as in claim 9, wherein said zinc compound is selected from the group consisting of zinc carbonate.

11. A color stabliized copolymer composition as in claim 9, wherein said zinc compound is selected from the group consisting of zinc chloride.

12. A color stabilized copolymer composition as in claim 9, wherein said zinc compound is selected from the group consisting of zinc sulfate.

* * * * *

PO-1050
(5/69)

UNITED STATES PATENT OFFICE
CERTIFICATE OF CORRECTION

Patent No. 3,884,872          Dated May 20, 1975

Inventor(s)     Robert R. Falconio

It is certified that error appears in the above-identified patent and that said Letters Patent are hereby corrected as shown below:

Column 1, line 17 "dehydrochlorination" should be --dehydrochlorinate --.

In Table 1, Sample 1, second line "Polyvinychoride" should be -- Polyvinylchloride --

In Table 1, Under column heading Initial Ai, Sample 1, line 6 "0.01" should be -- 0.015 --

In Table 1, Under column heading Initial Ai, Sample 1, line 7, "0.01" should be -- 0.015 --

Signed and Sealed this thirtieth Day of September 1975

[SEAL]

Attest:

RUTH C. MASON
Attesting Officer

C. MARSHALL DANN
Commissioner of Patents and Trademarks